United States Patent
Fredinburg et al.

(10) Patent No.: US 9,280,592 B1
(45) Date of Patent: Mar. 8, 2016

(54) ZOMBIE DETECTOR AND HANDLER MECHANISM FOR ACCOUNTS, APPS, AND HARDWARE DEVICES

(71) Applicant: GOOGLE INC., Mountain View, CA (US)

(72) Inventors: Dan Fredinburg, San Francisco, CA (US); Keith Patrick Enright, San Francisco, CA (US); Andrew Swerdlow, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 303 days.

(21) Appl. No.: 13/815,905

(22) Filed: Mar. 15, 2013

(51) Int. Cl.
G06F 17/30 (2006.01)

(52) U.S. Cl.
CPC .............................. *G06F 17/30598* (2013.01)

(58) Field of Classification Search
CPC ................... G06F 17/30073; G06F 17/30082; G06F 17/30598; G06F 17/30604; H04L 63/10; H04L 63/108
See application file for complete search history.

(56) References Cited

U.S. PATENT DOCUMENTS

| | | | |
|---|---|---|---|
| 7,383,215 B1* | 6/2008 | Navarro et al. | 705/36 R |
| 7,720,733 B2 | 5/2010 | Jung et al. | |
| 2003/0187826 A1* | 10/2003 | Kennedy et al. | 707/1 |
| 2003/0229585 A1* | 12/2003 | Butler | 705/39 |
| 2005/0256882 A1* | 11/2005 | Able et al. | 707/10 |
| 2006/0015930 A1* | 1/2006 | Shoham | 726/6 |
| 2006/0143126 A1 | 6/2006 | Vasishth et al. | |
| 2007/0198662 A1 | 8/2007 | Parham et al. | |
| 2007/0203725 A1 | 8/2007 | Jung et al. | |
| 2008/0046576 A1* | 2/2008 | Wahl | 709/228 |
| 2008/0162309 A1* | 7/2008 | Tardif | 705/30 |
| 2008/0167994 A1 | 7/2008 | Li et al. | |
| 2008/0271110 A1* | 10/2008 | Graves et al. | 726/1 |
| 2009/0048884 A1* | 2/2009 | Olives et al. | 705/7 |
| 2010/0132023 A1 | 5/2010 | Reese et al. | |
| 2010/0168689 A1* | 7/2010 | Swain et al. | 604/313 |
| 2010/0312661 A1 | 12/2010 | Jung et al. | |
| 2012/0047055 A1* | 2/2012 | Aiello | 705/35 |
| 2012/0095891 A1* | 4/2012 | Horn et al. | 705/35 |
| 2013/0080532 A1* | 3/2013 | Stewart | 709/204 |
| 2013/0169815 A1* | 7/2013 | Carney et al. | 348/156 |

(Continued)

OTHER PUBLICATIONS

Strickland, J., What Happens to all my Social Networking Information When I Die?, howstuffworks.com, 3 pages, [online] [retrieved on Mar. 7, 2012] URL: http://computer.howstuffworks.com/social-networking-death.htm.

(Continued)

*Primary Examiner* — Christyann Pulliam
*Assistant Examiner* — Rezwanul Mahmood
(74) *Attorney, Agent, or Firm* — Procopio, Cory, Hargreaves & Savitch LLP (57) ABSTRACT

A computer-implemented method, including identifying user subscriptions that meet at least one criterion of a plurality of criteria for detecting subscriptions that are no longer active, classifying the user subscriptions into a first group and a second group, where user subscriptions in the first group have at least one context factor associated with the at least one criterion, matching the user subscriptions of the second group with data of unavailable users to produce a third group of user subscriptions, where the user subscriptions of the third group are successfully matched with some of the data of unavailable users.

20 Claims, 4 Drawing Sheets

(56) References Cited

U.S. PATENT DOCUMENTS

2013/0198381 A1* 8/2013 Caffrey et al. ............... 709/225
2014/0180792 A1* 6/2014 Zaheer et al. ............. 705/14.43

OTHER PUBLICATIONS

Nebraska is Latest State to Address Digital Legacy, deathanddigitallegacy.com, Feb. 20, 2012, 18 pages [online] [retrieved on Mar. 7, 2012] URL: http://www.deathanddigitallegacy.com/index.php?s=nebraska+is+latest+state+to+address+digital+legacy.

What Happens to Your Online Digital Assets if you Die?, thelongestwayhome.com, Sep. 29, 2010, 14 pages, [online] [retrieved on Mar. 9, 2012] URL: http://www.thelongestwayhome.com/blog/how-to-live-overseas/what-happens-to-your-email-website-social-networking-accounts-when-you-die/.

Privacy: Deactivating, Deleting, and Memorializing Accounts, facebook.com, 1 page, [online] [retrieved on Mar. 2, 2012], URL: http://www.facebook.com/help/?page=185698814812082.

* cited by examiner

ZOMBIE DETECTOR AND HANDLER MECHANISM FOR ACCOUNTS, APPS, AND HARDWARE DEVICES

BACKGROUND

1. Field

The subject matter described herein relates generally to online services and, more particularly, to user content access management and control of user information residing in computer software.

2. Background Information

Online services are becoming more prevalent. Users of very young ages to very old ages are communicating with each other using one or more online services, as well as storing information and data online (e.g., storing and backing up data, sharing images and videos, etc.).

After online services are first used, however, users do not always continue to access the services. For example, a user may abandon or stop using one image sharing site and start using another image sharing site. A user may stop using a college-focused service after graduation from college. A user may die or be incapacitated and cease accessing online services. Additionally, many online services are accessible through applications installed on mobile devices, which are then authorized to access these online services. However, mobile devices are susceptible to being lost, damaged, or stolen resulting in an authorization no longer accessible to the user of the account.

These inactive accounts ("zombie accounts"), inaccessible authorizations ("zombie authorizations"), no longer used applications ("zombie applications"), and lost, damaged, or stolen devices ("zombie devices") (collectively referred to herein as "subscriptions") can pose a burden on system infrastructure as resources must be used to support subscriptions that are no longer active. Further, these subscriptions may also pose a potential source for breaches of the user's privacy (i.e. person information, financial information, private date, etc.) if the subscriptions become susceptible to third party access. Further, these subscriptions may also continue to take actions, such as posting automatic updates, sending automatic replies, or indicating a user's support for goods and services.

Zombie accounts that have scheduled activity or apps that can act on a user's behalf may make it appear that the user is still alive and active, causing great trauma to the recipients of messages or viewers of social media posts (e.g. deceased user's account, application, or mobile device continuing to auto post to their wall that they've been using an app for 2 full years on the apps anniversary because it was scheduled by the app in advance). Thus, there is a need for identifying and categorizing subscriptions that have become inactive so that subsequent actions may be taken.

SUMMARY

One aspect of the present application may include a computer-implemented method, comprising identifying user subscriptions that meet at least one criterion of a plurality of criteria for detecting subscriptions that are no longer active; classifying the user subscriptions into a first group and a second group, where the user subscriptions in the first group have at least one context factor associated with the at least one criterion; and matching the user subscriptions of the second group with data of unavailable users to produce a third group of user subscriptions, where the user subscriptions of the third group are matched with some of the data of unavailable users.

Another aspect of the present application may include a non-transitory computer readable medium having stored therein computer executable instructions for identifying user subscriptions that meet at least one criterion of a plurality of criteria for detecting subscriptions that are no longer active; classifying the user subscriptions into a first group and a second group, where the user subscriptions in the first group have at least one context factor associated with the at least one criterion; and matching the user subscriptions of the second group with data of unavailable users to produce a third group of user subscriptions, where the user subscriptions of the third group are matched with some of the data of unavailable users.

Another aspect of the present application may include at least one computing device comprising storage and a processor configured to perform identifying user subscriptions that meet at least one criterion of a plurality of criteria for detecting subscriptions that are no longer active; classifying the user subscriptions into a first group and a second group, where the user subscriptions in the first group have at least one context factor associated with the at least one criterion; and matching the user subscriptions of the second group with data of unavailable users to produce a third group of user subscriptions, where the user subscriptions of the third group are matched with some of the data of unavailable users.

DETAILED DESCRIPTION

The subject matter described herein is taught by way of example implementations. Various details have been omitted for the sake of clarity and to avoid obscuring the subject matter. The examples shown below are directed to structures and functions for implementing identifying inactive accounts (or zombie accounts).

Figure 1:
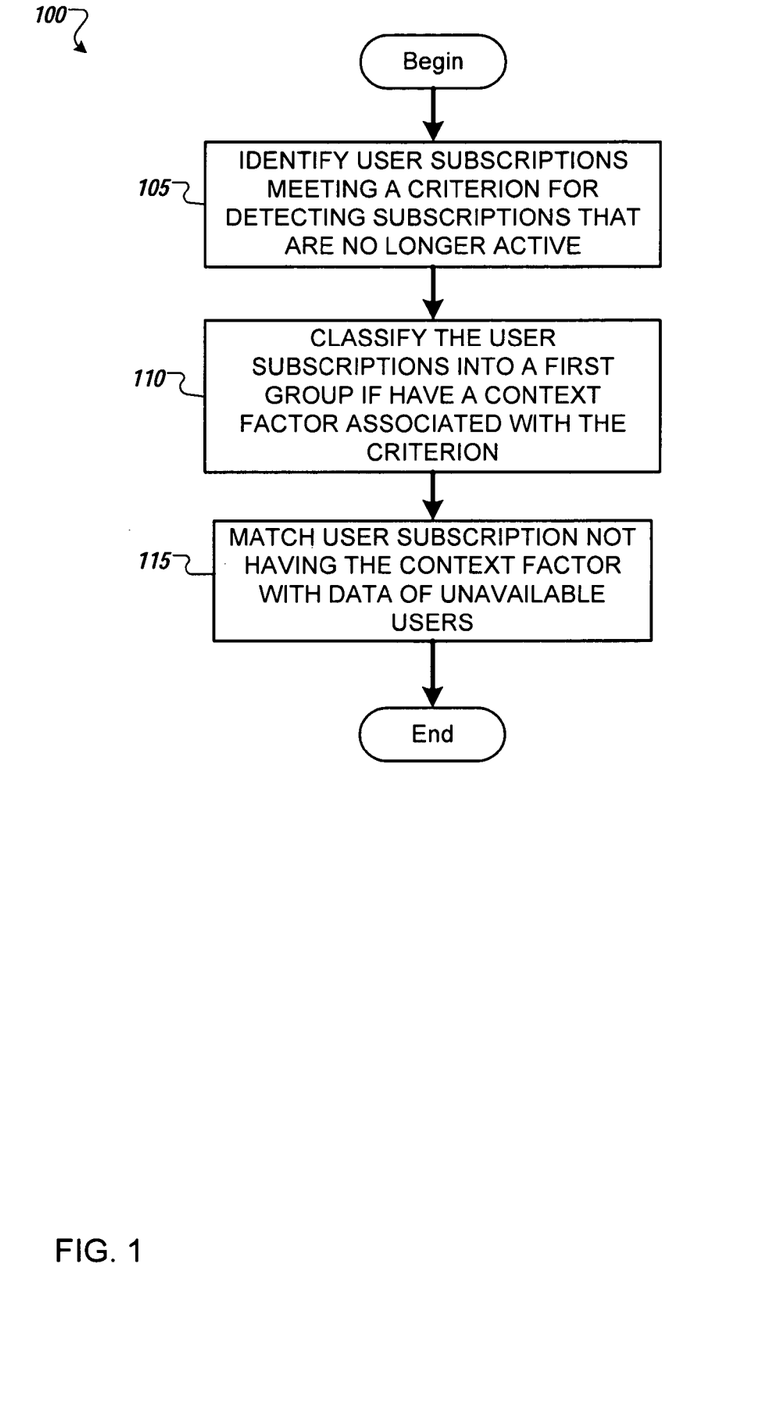
FIG. 1 is a flowchart of an example method according to at least one example implementation.

FIG. 1 illustrates an example method 100 according to at least one example implementation. In 105, user subscriptions meeting at least one criteria used for detecting subscriptions that are no longer active are identified. As used herein, "user subscriptions" can include a wide variety of accounts including but not limited to, e-mail accounts, social media accounts, photo sharing accounts, video sharing accounts, cloud storage account, electronic wallet accounts (i.e. accounts for storing user bank account and credit card information to be used for purchases online or in-stores), etc. Additionally, "user subscriptions" may also include access authorizations previously granted to applications running on any devices or clients, including but not limited to mobile devices to access services associated with the user, and/or account information stored on accounts.

Additionally, the methods and processes described in this application can also be used to identify and handle applications and devices that are no longer being actively used and may have become inactive applications (i.e. "zombie apps") and lost, damaged, or stolen devices (i.e. "zombie devices").

Criteria that could be used to detect subscriptions associated with accounts, apps, or devices that are no longer active are not particularly limited, and may include duration of time between successive logins or access attempts, duration of time between use of an application associated with a user subscription, duration of time between new authorizations of applications to access user accounts, etc.

After user subscriptions associated with accounts, apps, or devices are identified based on at least one criterion in 105, the identified user subscriptions are classified into either a first group or a second group based on the presence of context factors associated with the criteria in 110. Specifically, each of the identified user subscriptions is classified into the first group if at least one context factor is present and is classified into the second group if the no context factors are present.

Context factors may include: information associated with the account, app, or device indicating a user's prior access habits or history (such as the user has previously gone, or regularly goes, extended periods of time without accessing the account), information indicating the nature of the account, app, or devices (such as the account is a medical records account that is usually accessed only a few times each year, or the account is a student application only used when school is in session, or the device is a work device used only during work weeks), information indicating the nature of the content stored in by the account, app or device (such as the stored content is archived records being stored for posterity), and information regarding the current season or time of year (such as it is the weekend, or it is summer or winter break of the school).

This context information may be used to indicate a reason that the subscription associated with the accounts, apps, or devices may not have been accessed for extended periods of time, or which may justify why the criteria for detecting a subscription is no longer active were present. Thus, subscriptions associated with accounts, apps, or devices having a context factor are classified in the first group indicating a low likelihood that the subscriptions have become inactive. Conversely, subscriptions associated with accounts, apps, or devices not having any context factors are classified as in the second group indicating further investigation may be necessary.

Any subscriptions associated with accounts, apps, or devices classified in the second group in 110 are matched with data of unavailable users or devices to produce a third group of user subscriptions. More specifically, databases or lists of unavailable users or devices are used to identify and classify some of the subscriptions in the second group into a third group, which match the database or list content. The data of unavailable users or devices can come from a variety of sources including publicly available obituary or death notice information, databases of accounts that have been identified by users as having been abandoned, or hijacked, databases from telecom providers identifying mobile devices that have been returned, repossessed, or reported lost, stolen, or damaged. Of course, additional sources of data of unavailable users or devices may also be used as would be apparent to a person of ordinary skill in the art.

Based on the data of unavailable users or devices, some of the subscriptions previously classified in group 2 may be reclassified as group 3 because they have a higher likelihood that the subscriptions are associated with accounts, apps, or devices have become inactive (i.e. zombie accounts, apps or devices) than subscriptions in group 1 or group 2.

As discussed below, a variety of actions can be taken based on the classification of user subscriptions (or app/device) as group 1, group 2, or group 3.

Figure 2:
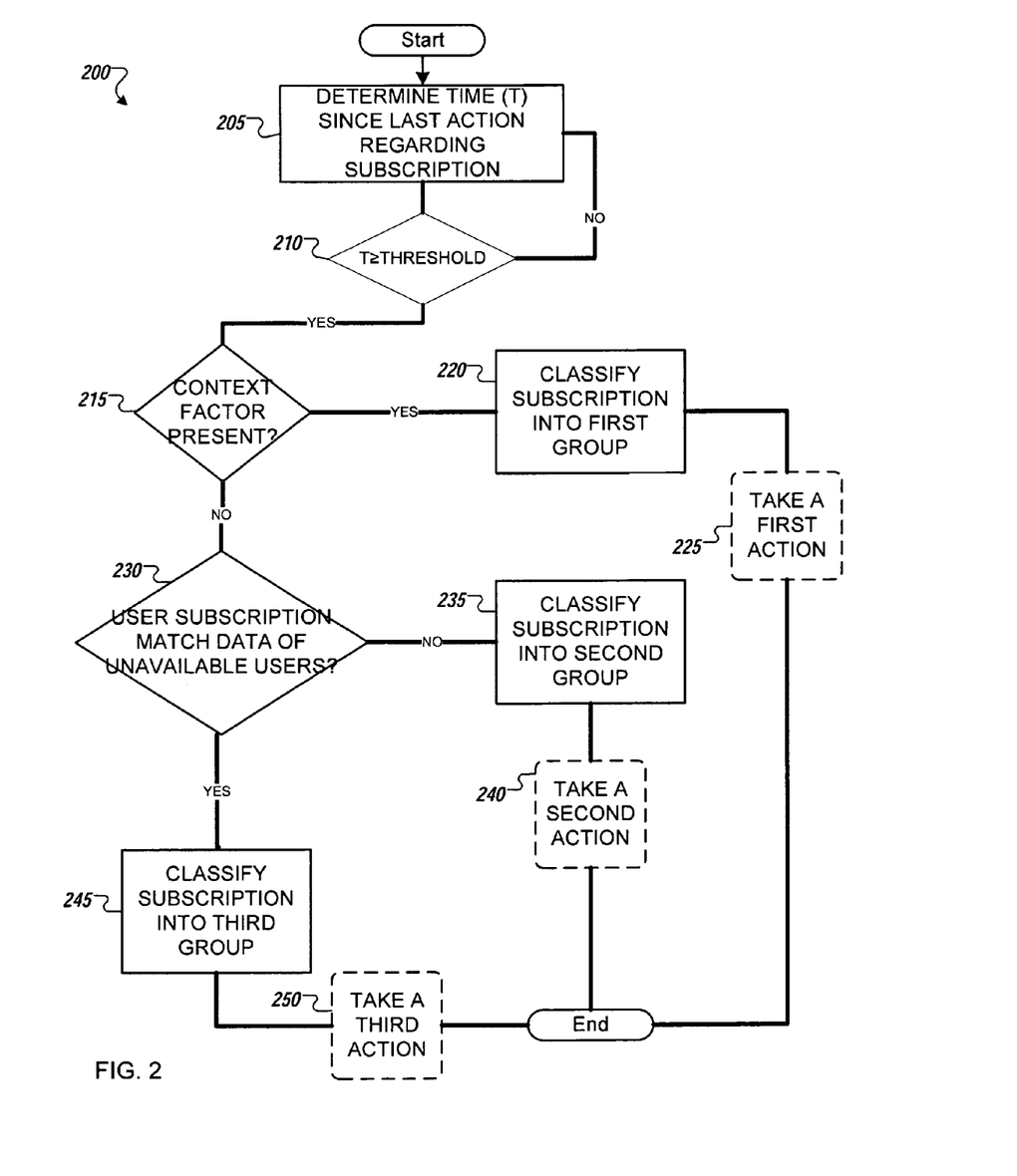
FIG. 2 shows an example process flow implementing the method of at least on example implementation.

FIG. 2 shows an example process flow 200 implementing the method of at least on example implementation. In 205, a duration of inactivity is determined by determining the time (T) since last action by the user with respect to the subscription associated with an account, app, or device. As discussed above, the duration of inactivity may be based on any one of a number of factors including: a duration of time between successive logins or access attempts, duration of time between uses of an application associated with a user subscription, duration of time between new authorizations of applications to access user accounts, etc.

Once the time since last action by the user is determined in 205, the determined time (T) since last action by the user is compared to a threshold time value at 210. The threshold time value can be predetermined by system administrators, can be selected by the user based on user settings, or can be dynamically determined based on at least one of the type of account, app, or device and the nature of data being stored in by the account, app, or device. For example, the threshold time value could be determined by settings customized by the user, or could be default values based on the type of account, app, or device or the type of data (e.g. 30 days for stored emails, 6 months for social media, 2 years for stored personal records, etc.).

If the determined time (T) since last action by the user is less than the threshold value, the process returns to 205, which is repeated until the determined time (T) exceeds the threshold value. If the determined time (T) is greater than the threshold, the process continues to 215 so that the subscription can be further analyzed.

Any subscriptions associated with accounts, apps, or devices that were determined to have time since last action (T) greater than the threshold (i.e. T≥Threshold) in 210 are examined to determine if there are any context factors that might justify or explain extended duration of time since last action in 215.

As discussed above, context factors may include: information associated with the account, app, or device indicating a user's prior access habits or history (such as the user has previously gone, or regularly goes, extended periods of time without accessing the account), information indicating the nature of the account, app, or devices (such as the account is a medical records account that is usually accessed only a few times each year, or the account is a student application only used when school is in session, or the device is a work device used only during work weeks), information indicating the nature of the content stored in by the account, app or device (such as the stored content is archived records being stored for posterity), and information regarding the current season or time of year (such as it is the weekend, or it is summer or winter break of the school).

The foregoing are merely examples of context information, and other types of context information may be apparent to a person of ordinary skill in the art. The context information may be used to indicate a reason or explain why the subscription associated with accounts, apps, or devices may not have had any activity for extended periods of time, or which may justify why the criteria for detecting a subscription is no longer active were present.

If a subscription is associated with an account, app, or device is found to have at least one context factor in 215, the subscription is classified into a first group (i.e. group 1) in 220. Classification into this first group could indicate that there is a relatively low likelihood that the subscription associated with an account, app, or device has become inactive. Once a subscription is classified into the first group in 220, a first action may be taken in 225. Actions taken in 225 may reflect an understanding that the subscription has having a low likelihood of having become inactive.

Examples could include sending a verification notification to the user indicating that the account had been determined to identified has having an extended period with activity, requesting further information from the user, or requiring a user provide additional information during next subscription access attempt (i.e. if the subscription relates to an authorized application on a mobile device, requiring the user to reauthorize the application next time the application is activated, requiring have the user reauthenticate the device prior to being able to use the device).

Additionally, as subscriptions associated with accounts, apps, or devices classified into group 1 may have a low likelihood of having become inactive, action taken in 225 may also include simply waiting an additional period of time and repeating the process of 205, 210, and 215 discussed above to determine if circumstances have changes and the subscription should be reclassified into groups 2 or 3 discussed below (i.e. no context factors are present and likelihood the subscription has become inactive have increased).

Conversely, if a subscription associated with an account, app, or device is found to not have any context factors in 215, the process continues to 230, where the subscription is matched against compiled data of users or devices identified as being unavailable in 230. As discussed above, the data of unavailable users or devices can come from a variety of sources include publicly available obituary or death notice information, databases of accounts that have been identified by users as having been abandoned, or hijacked, databases from telecom providers identifying mobile devices that have been returned, repossessed, or reported lost, stolen, or damaged. Of course, additional sources of data of unavailable users may also be used as would be apparent to a person of ordinary skill in the art.

If a subscription associated with an account, app, or device is found to not match the compiled data of unavailable users or devices in 230, the subscription is classified as into a second group (i.e. group 2) in 235. Classification into this second group could indicate that there is a moderate likelihood that the subscription is associated with an account, app, or device that has become inactive. Once a subscription associated with an account, app, or device is classified into the second group in 235, a second action may be taken in 240. Actions taken in 240 may reflect an understanding that the subscription associated with accounts, apps, or devices has a moderate likelihood of having become inactive.

Examples could include restricting automatic actions by the subscriptions associated with accounts, apps, or devices (such as sending automatic emails, or automatic updates/notifications on social media), restricting viewability of the subscription by others (such as viewable only to certain contacts, rather than the world), requiring that the user reauthorize applications or mobile devices, disabling automatic updating of applications or devices or plug-ins until user has reauthorized the apps or device, and limiting locations of storage of account, application, or device data to centralized servers rather than local servers provided for quicker access. Of course, other actions may be taken based on the subscription associated with accounts, apps, or devices being classified as having a moderate likelihood of having become inactive as would be apparent to a person of ordinary skill in the art.

If a subscription is found to match the compiled data of unavailable users or devices in 230, the subscription is classified as into a third group (i.e. group 3) in 245. Classification into this third group could indicate that there is a relatively high likelihood that the subscription is associated with an account, app, or devices has become inactive. Once a subscription is classified into the third group in 245, a third action may be taken in 250. Actions taken in 250 may reflect an understanding that the subscription associated with accounts, apps, or devices has a high likelihood of having become inactive. Examples, could include preventing automatic actions by the subscriptions (such as sending automatic emails, or automatic updates/notifications on social media), blocking viewability of the subscription by others (i.e. no one other than user can view), archiving the subscription and deleting from main servers, deleting applications associated with the subscription from mobile devices, disabling the device, sending notifications to the user's contacts, and transferring the contents of the account to other contacts of the user. Of course, other actions may be taken based on the subscription being classified as having a having a high likelihood of having become inactive as would be apparent to a person of ordinary skill in the art.

In some implementations, process 200 discussed above may be implemented with different, fewer, or more blocks. Process 200 may be implemented as computer executable instructions, which can be stored on a medium, loaded onto one or more processors of one or more computing devices, and executed as a computer-implemented method. Further, the one or more computing devices may include servers storing and maintaining the user subscriptions. Additionally, the one or more computing devices may include applications running on a mobile device that communicate with servers storing and maintaining the user subscriptions.

Figure 3:
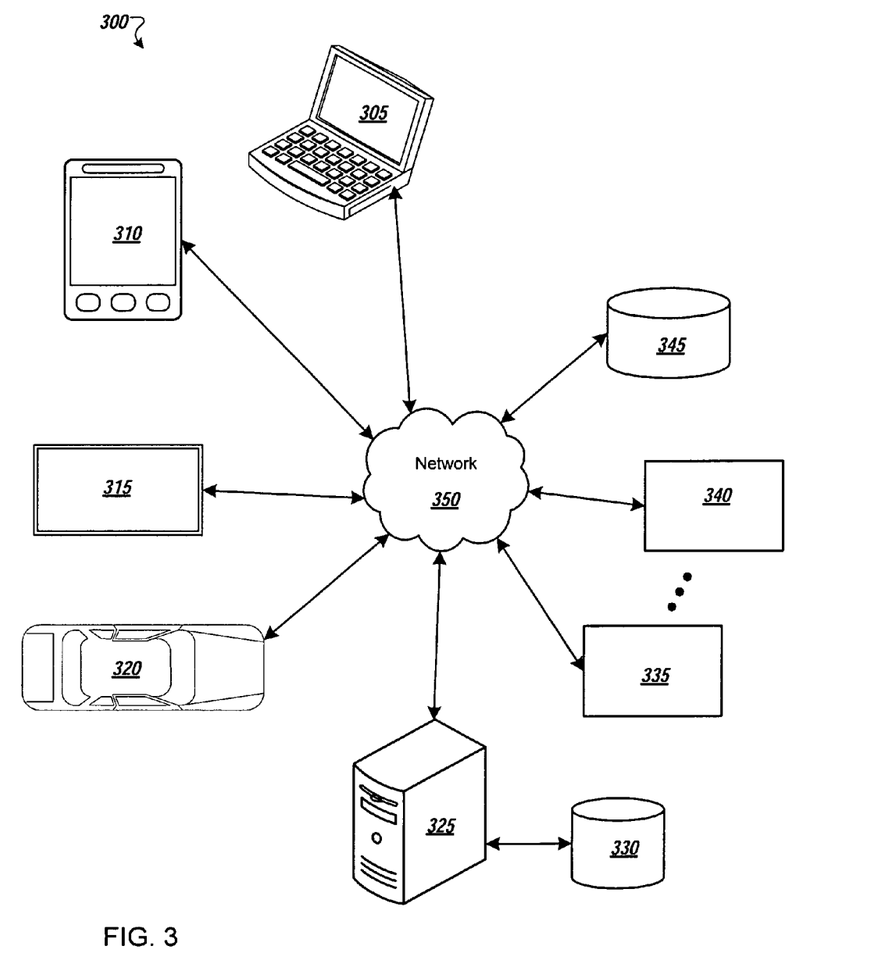
FIG. 3 shows an example environment suitable for some example implementations.

FIG. 3 shows an example environment suitable for some example implementations. Environment 300 includes devices 305-345, and each is communicatively connected to at least one other device via, for example, network 360 (e.g., by wired and/or wireless connections). Some devices may be communicatively connected to one or more storage devices 330 and 345.

An example of one or more devices 305-345 may be computing device 405 described below in FIG. 4. Devices 305-345 may include, but are not limited to, a computer 305 (e.g., a laptop computing device), a mobile device 310 (e.g., smartphone or tablet), a television 315, a device associated with a vehicle 320, a server computer 325, computing devices 335-340, storage devices 330 and 345.

For example, a mobile device may passively or actively monitor when a user most recently used an application associated with a user subscription and when the duration since the most recent access exceeds a threshold may notify or communicate with a server associated with the subscription. The server or the mobile device may then determine whether any context factors are present that may justify the period of inactivity.

Further, the server, or the mobile device may then attempt to match the subscription to available data regarding unavailable users. Based on the context factor determination and the matching to unavailable user data, the server and mobile device may take action as discussed above with respect to process 200. In some implementations, devices 305-320 may be considered user devices (e.g., devices used by users to access services and/or issue requests, such as on a social network). Devices 325-345 may be devices associated with service providers (e.g., used by service providers to provide services and/or store data, such as webpages, text, text portions, images, image portions, audios, audio segments, videos, video segments, and/or information thereabout).

For example, a user (e.g., Alice) may access, view, and/or share content or a webpage using user device 305 or 310 on a social network supported by one or more devices 325-345. A recipient (e.g., Bob) may access and/or view Alice's shared content using device 315 or 320.

Figure 4:
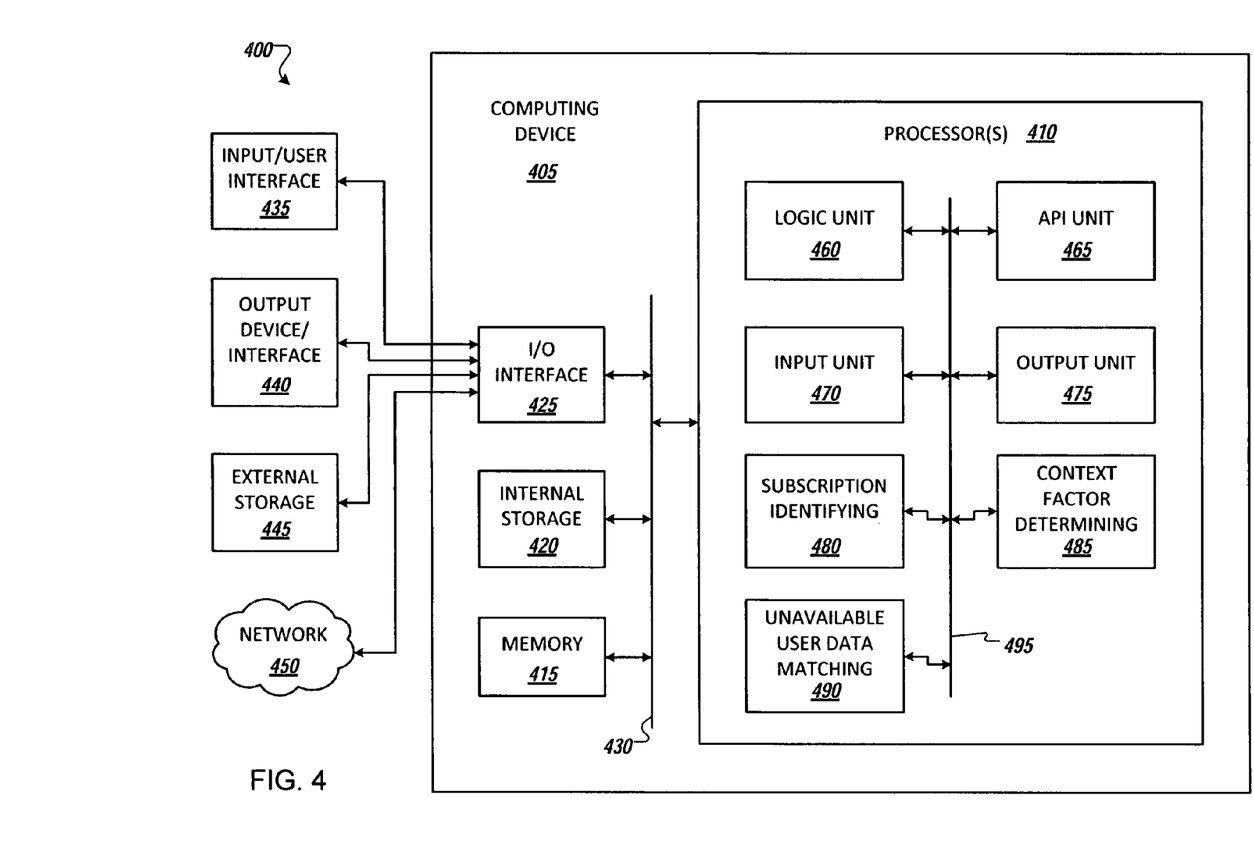
FIG. 4 shows an example computing environment with an example computing device suitable for use in some example implementations.

FIG. 4 shows an example computing environment with an example computing device suitable for use in some example implementations. Computing device 405 in computing environment 400 can include one or more processing units, cores, or processors 410, memory 415 (e.g., RAM, ROM, and/or the like), internal storage 420 (e.g., magnetic, optical, solid state storage, and/or organic), and/or I/O interface 425, any of which can be coupled on a communication mechanism or bus 430 for communicating information or embedded in the computing device 605.

Computing device 405 can be communicatively coupled to input/user interface 435 and output device/interface 440. Either one or both of input/user interface 435 and output device/interface 440 can be a wired or wireless interface and can be detachable. Input/user interface 435 may include any device, component, sensor, or interface, physical or virtual, that can be used to provide input (e.g., buttons, touch-screen interface, keyboard, a pointing/cursor control, microphone, camera, braille, motion sensor, optical reader, and/or the like).

Output device/interface 440 may include a display, television, monitor, printer, speaker, braille, or the like. In some example implementations, input/user interface 435 and output device/interface 440 can be embedded with or physically coupled to the computing device 405. In other example implementations, other computing devices may function as or provide the functions of input/user interface 435 and output device/interface 440 for a computing device 605.

Examples of computing device 405 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 405 can be communicatively coupled (e.g., via I/O interface 425) to external storage 445 and network 450 for communicating with any number of networked components, devices, and systems, including one or more computing devices of the same or different configuration. Computing device 405 or any connected computing device can be functioning as, providing services of, or referred to as a server, client, thin server, general machine, special-purpose machine, or another label.

I/O interface 425 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 400. Network 450 can be any network or combination of networks (e.g., the Internet, local area network, wide area network, a telephonic network, a cellular network, satellite network, and the like).

Computing device 405 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 405 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 410 can execute under any operating system (OS) (not shown), in a native or virtual environment. One or more applications can be deployed that include logic unit 460, application programming interface (API) unit 465, input unit 470, output unit 475, Subscription identifying unit 480, context factor determining unit 485, unavailable user data matching unit 490, and inter-unit communication mechanism 495 for the different units to communicate with each other, with the OS, and with other applications (not shown). For example, Subscription identifying unit 480, context factor determining unit 485, and unavailable user data matching unit 490 may implement one or more processes shown in FIGS. 1 and 2. The described units and elements can be varied in design, function, configuration, or implementation and are not limited to the descriptions provided.

In some example implementations, when information or an execution instruction is received by API unit 465, it may be communicated to one or more other units (e.g., logic unit 460, input unit 470, output unit 475, Subscription identifying unit 480, context factor determining unit 485, and unavailable user data matching unit 490).

For example, subscription identifying unit 480 may identify subscription meeting one or more criteria for detecting subscriptions that are no longer active after input unit 470 has detected a user indication or feedback regarding the criteria for detecting subscriptions. Further, input unit 470 may use API unit 465 to communicate the user indication to Subscription identifying unit 480. Subscription identifying unit 480 may, via API unit 465, interact with context factor determining unit 485 to identify subscriptions having at least one of the criteria and detect any context factors present. Further, using API unit 465, Subscription identifying unit 480 may interact with unavailable user data matching unit 490 to match identified subscriptions not having context factors against the data of unavailable users to classify the subscriptions and take further action.

In some instances, logic unit 460 may be configured to control the information flow among the units and direct the services provided by API unit 465, input unit 470, output unit 475, Subscription identifying unit 480, context factor determining unit 485, and unavailable user data matching unit 490 in some example implementations described above. For example, the flow of one or more processes or implementations may be controlled by logic unit 460 alone or in conjunction with API unit 465.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed.

For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
identifying user subscriptions that meet at least one criterion of a plurality of criteria for detecting user subscriptions that are no longer active, the user subscriptions comprising online accounts of users or access authorizations of the users to applications to operate on one or more devices;
classifying the user subscriptions having account context information associated with the user subscriptions that are inactive into a first group;
for the user subscriptions in the first group, taking a first action comprising requiring verification or additional information on a future login attempt by the user;
comparing the user subscriptions not having the account context information associated with the user subscriptions that are inactive with data of unavailable users associated with at least one of a deceased user, a user having a stolen, misplaced, or missing account, and a device no longer in the possession of the user;
classifying the compared subscriptions into a second group if there is no match between the data of the unavailable users and the user subscriptions not having the account context information associated with the user subscriptions that are inactive;
for the user subscriptions in the second group, taking a second action comprising restricting automatic actions and viewability, or requiring the user to reauthorize the account prior to further login;
classifying the compared subscriptions into a third group if there is a match between the data of the unavailable users and the user subscriptions not having the account context information associated with the user subscriptions that are inactive; and
for the user subscriptions in the third group, taking a third action comprising one or more of blocking the automatic actions and the viewability by other users, archiving and deleting the user subscription and the applications, disabling the device of the user, sending a notification to contacts of the user, and transferring the account to the contacts of the user.

2. The computer-implemented method of claim 1, wherein the data of unavailable users comprises:
a database of obituary or death notices;
a database of accounts that have been reported as stolen, lost or missing;
a database of devices that have been identified as have been stolen, lost or missing.

3. The computer implemented method of claim 1, wherein one of the criteria for detecting subscriptions that are no longer active is a duration of inactivity having exceeding a threshold value.

4. The computer implemented method of claim 3, wherein the threshold value for the duration of inactivity is determined based on account identifying information, and the threshold value may be set dynamically.

5. The computer implemented method of claim 4, wherein the account identifying information includes information regarding type of account and type of information stored in account.

6. The computer implemented method of claim 1, wherein the account context information includes:
information regarding the nature of the account;
information regarding the history of access by the user;
information regarding the nature of the online content stored in the account; and
information regarding a season or a time of year.

7. A non-transitory computer readable medium having stored therein computer executable instructions for:
identifying user subscriptions that meet at least one criterion of a plurality of criteria for detecting user subscriptions that are no longer active, the user subscriptions comprising online accounts of users or access authorizations of the users to applications to operate on one or more devices;
classifying the user subscriptions having account context information associated with the user subscriptions that are inactive into a first group;
for the user subscriptions in the first group, taking a first action comprising requiring verification or additional information on a future login attempt by the user;
comparing the user subscriptions not having the account context information associated with the user subscriptions that are inactive with data of unavailable users associated with at least one of a deceased user, a user having a stolen, misplaced, or missing account, and a device no longer in the possession of the user;
classifying the compared subscriptions into a second group if there is no match between the data of the unavailable users and the user subscriptions not having the account context information associated with the user subscriptions that are inactive;
for the user subscriptions in the second group, taking a second action comprising restricting automatic actions and viewability, or requiring the user to reauthorize the account prior to further login;
classifying the compared subscriptions into a third group if there is a match between the data of the unavailable users and the user subscriptions not having the account context information associated with the user subscriptions that are inactive; and
for the user subscriptions in the third group, taking a third action comprising one or more of blocking the automatic actions and the viewability by other users, archiving and deleting the user subscription and the applications, disabling the device of the user, sending a notification to contacts of the user, and transferring the account to the contacts of the user.

8. The computer readable medium of claim 7, wherein the data of unavailable users comprises:
a database of obituary or death notices;
a database of accounts that have been reported as stolen, lost or missing;

a database of devices that have been identified as have been stolen, lost or missing.

9. The computer readable medium of claim 7, wherein one of the criteria for detecting subscriptions that are no longer active is a duration of inactivity having exceeding a threshold value.

10. The computer readable medium of claim 9, wherein the threshold value for the duration of inactivity is determined based on account identifying information, and the threshold value may be set dynamically.

11. The computer readable medium of claim 10, wherein the account identifying information includes information regarding type of account and type of information stored in account.

12. The computer implemented method of claim 7, wherein the account context information includes:
  information regarding the nature of the account;
  information regarding the history of access by the user;
  information regarding the nature of the online content stored in the account; and
  information regarding a season or a time of year.

13. At least one computing device comprising storage and a processor configured to perform:
  identifying user subscriptions that meet at least one criterion of a plurality of criteria for detecting user subscriptions that are no longer active, the user subscriptions comprising online accounts of users or access authorizations of the users to applications to operate on one or more devices;
  classifying the user subscriptions having account context information associated with the user subscriptions that are inactive into a first group;
  for the user subscriptions in the first group, taking a first action comprising requiring verification or additional information on a future login attempt by the user;
  comparing the user subscriptions not having the account context information associated with the user subscriptions that are inactive with data of unavailable users associated with at least one of a deceased user, a user having a stolen, misplaced, or missing account, and a device no longer in the possession of the user;
  classifying the compared subscriptions into a second group if there is no match between the data of the unavailable users and the user subscriptions not having the account context information associated with the user subscriptions that are inactive;
  for the user subscriptions in the second group, taking a second action comprising restricting automatic actions and viewability, or requiring the user to reauthorize the account prior to further login;
  classifying the compared subscriptions into a third group if there is a match between the data of the unavailable users and the user subscriptions not having the account context information associated with the user subscriptions that are inactive; and
  for the user subscriptions in the third group, taking a third action comprising one or more of blocking the automatic actions and the viewability by other users, archiving and deleting the user subscription and the applications, disabling the device of the user, sending a notification to contacts of the user, and transferring the account to the contacts of the user.

14. The at least one computing device of claim 13, wherein the data of unavailable users comprises:
  a database of obituary or death notices;
  a database of accounts that have been reported as stolen, lost or missing;
  a database of devices that have been identified as have been stolen, lost or missing.

15. The at least one computing device of claim 13, wherein one of the criteria for detecting subscriptions that are no longer active is a duration of inactivity having exceeding a threshold value.

16. The at least one computing device of claim 15, wherein the threshold value for the duration of inactivity is determined based on account identifying information, and the threshold value may be set dynamically.

17. The at least one computing device of claim 16, wherein the account identifying information includes information regarding type of account and type of information stored in account.

18. The at least one computing device of claim 13, wherein the account context information includes at least one of:
  information regarding the nature of the account;
  information regarding the history of access by the user;
  information regarding the nature of the online content stored in the account; and
  information regarding a season or a time of year.

19. The at least one computing device of claim 13, wherein the at least one computing device is a server configured to identify user subscriptions that meet the at least one criterion, classify the user subscriptions into the first group and the second group and match the user subscriptions of the second group.

20. The at least one computing device of claim 13, wherein the at least one computing device is a mobile device having at least on app associated with the subscription stored thereon;
  wherein the mobile device is configured to monitor user access to the app and detect when the user does not access the app for a period of time exceeding the threshold duration; and
  wherein the mobile device is further configured to communicate with a subscription provider that the threshold duration has been exceed when the user does not access the app for the period of time exceeding the threshold duration.

* * * * *